(12) United States Patent
Boone et al.

(10) Patent No.: US 11,474,576 B1
(45) Date of Patent: Oct. 18, 2022

(54) ELECTRICAL DEVICE WITH THERMALLY CONTROLLED PERFORMANCE

(71) Applicant: Rockwell Collins, Inc., Cedar Rapids, IA (US)

(72) Inventors: Alan P. Boone, Swisher, IA (US); Brandon C. Hamilton, Marion, IA (US); Kyle B. Snyder, Marion, IA (US); Bryan M. Jefferson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 692 days.

(21) Appl. No.: 16/523,216

(22) Filed: Jul. 26, 2019

(51) Int. Cl.
| | |
|---|---|
| *G06F 1/20* | (2006.01) |
| *G01K 7/42* | (2006.01) |
| *G01K 7/01* | (2006.01) |
| *G05D 23/19* | (2006.01) |
| *G05D 23/20* | (2006.01) |
| *G05D 23/22* | (2006.01) |
| *G05D 23/24* | (2006.01) |
| *G01K 7/02* | (2021.01) |

(52) U.S. Cl.
CPC ............... *G06F 1/206* (2013.01); *G01K 7/01* (2013.01); *G01K 7/425* (2013.01); *G05D 23/1932* (2013.01); *G05D 23/20* (2013.01); *G05D 23/22* (2013.01); *G05D 23/24* (2013.01); *G01K 7/02* (2013.01); *G06F 1/203* (2013.01)

(58) Field of Classification Search
CPC ......... G06F 1/206; G06F 1/203; G05D 23/22; G05D 23/24; G01K 7/02
See application file for complete search history.

(56) References Cited

U.S. PATENT DOCUMENTS

| | | | |
|---|---|---|---|
| 10,042,402 B2 * | 8/2018 | Eremenko | G06F 1/203 |
| 2014/0334107 A1 * | 11/2014 | Heresztyn | G01K 7/01 |
| | | | 361/720 |
| 2014/0371944 A1 * | 12/2014 | Vadakkanmaruveedu | ......... |
| | | | G05D 23/1917 |
| | | | 374/183 |

* cited by examiner

*Primary Examiner* — Lionel Nouketcha
(74) *Attorney, Agent, or Firm* — Suiter Swantz pc llo

(57) ABSTRACT

An electrical device with thermally controlled performance is disclosed. The electrical device includes at least one die with a plurality of device components disposed upon or at least partially embedded within the die. The electrical device further includes a plurality of signal paths interconnecting the plurality of device components. The electrical device further includes a plurality of temperature sensors disposed upon or at least partially embedded within the die. The temperature sensors are configured to detect thermal loads at respective portions of the die. The electrical device further includes at least one controller disposed upon or at least partially embedded within the die. The controller is configured to adjust one or more operating parameters for one or more of the device components based on the thermal loads detected by the temperature sensors.

19 Claims, 10 Drawing Sheets

300

302 — DETECTING THERMAL LOADS AT RESPECTIVE PORTIONS OF AT LEAST ONE DIE WITH A PLURALITY OF TEMPERATURE SENSORS DISPOSED UPON OR AT LEAST PARTIALLY EMBEDDED WITHIN THE DIE

304 — ADJUSTING ONE OR MORE OPERATING PARAMETERS FOR ONE OR MORE DEVICE COMPONENTS DISPOSED UPON OR AT LEAST PARTIALLY EMBEDDED WITHIN THE DIE BASED ON THE THERMAL LOADS DETECTED BY THE TEMPERATURE SENSORS

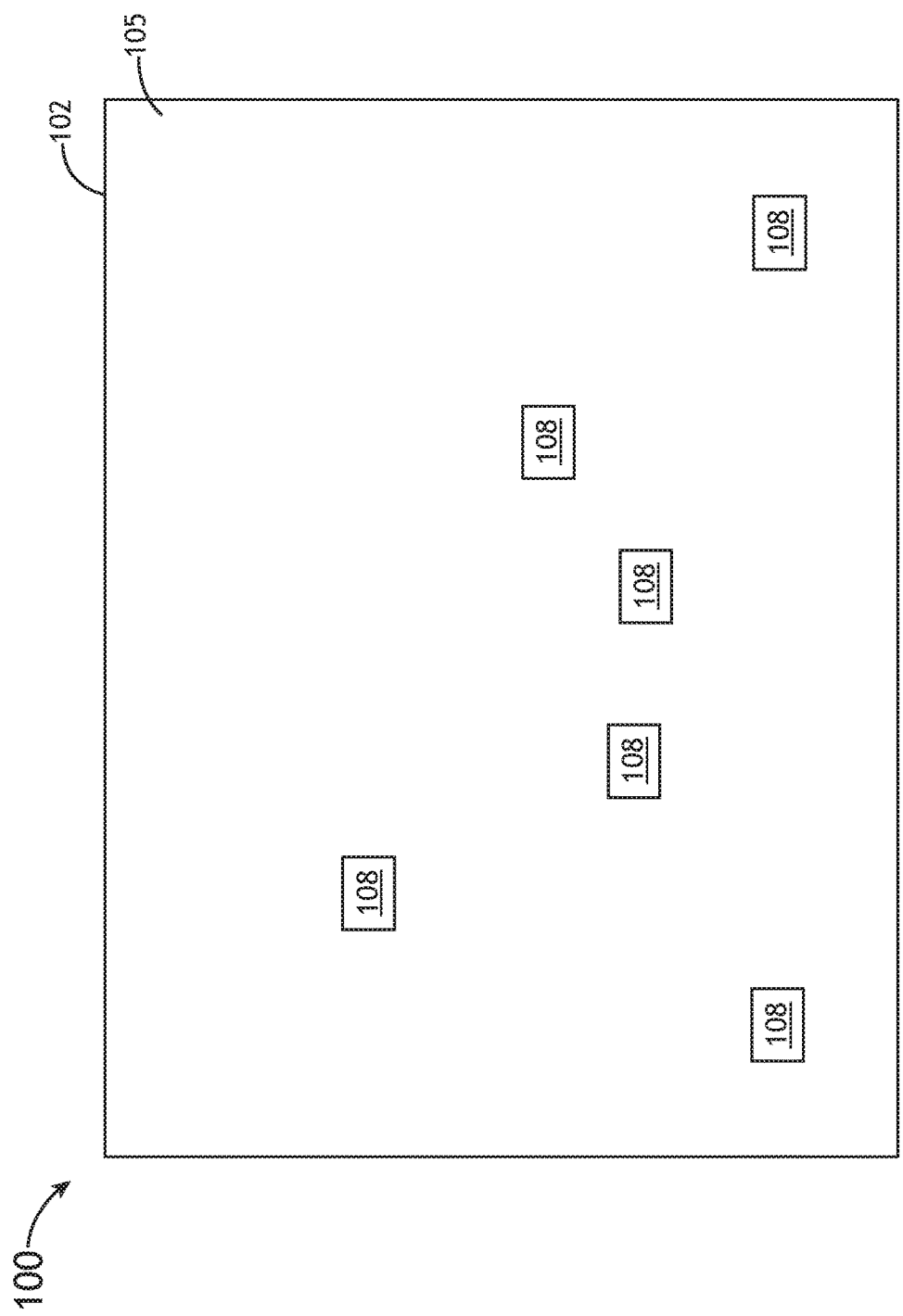

ELECTRICAL DEVICE WITH THERMALLY CONTROLLED PERFORMANCE

BACKGROUND

Current electronics systems are creating thermal loads that exceed the capabilities of thermal dissipation techniques/technologies. For example, in some cases, higher performance requirements are driving localized thermal loads that exceed the capacity to move the heat away from a thermal generation point creating an excess buildup of localized heat that exceeds the performance rating of an electrical device. Once the thermal rating is exceeded the electrical device may no longer operate at anticipated performance levels resulting in loss of product performance, reduced life and possible system failure. Current products are driven by increased performance requirements along with size and weight limitations that are further limiting the ability to control thermal performance. Consequently, there is a need for improved systems/techniques for controlling thermal loads and/or their distribution within an electrical device.

SUMMARY

An electrical device with thermally controlled performance is disclosed. In one or more embodiments, the electrical device includes at least one die with a plurality of device components disposed upon or at least partially embedded within the die. In embodiments, the electrical device further includes a plurality of signal paths interconnecting the plurality of device components. In embodiments, the electrical device further includes a plurality of temperature sensors disposed upon or at least partially embedded within the die. The temperature sensors are configured to detect thermal loads at respective portions of the die. In embodiments, the electrical device further includes at least one controller disposed upon or at least partially embedded within the die. The controller is configured to adjust one or more operating parameters for one or more of the device components based on the thermal loads detected by the temperature sensors.

In some embodiments of the electrical device, the controller is configured to adjust the one or more operating parameters for the one or more device components by throttling a clock speed of at least one device component based on at least one of the thermal loads detected by the temperature sensors.

In some embodiments of the electrical device, the controller is configured to adjust the one or more operating parameters for the one or more device components by limiting a bandwidth of at least one device component based on at least one of the thermal loads detected by the temperature sensors.

In some embodiments of the electrical device, the controller is configured to adjust the one or more operating parameters for the one or more device components by at least partially disabling at least one device component based on at least one of the thermal loads detected by the temperature sensors.

In some embodiments of the electrical device, the controller is configured to adjust the one or more operating parameters for the one or more device components by reprogramming at least one device component based on at least one of the thermal loads detected by the temperature sensors.

In some embodiments of the electrical device, the controller is configured to adjust the one or more operating parameters for the one or more device components by transferring at least one function from a device component to another device component based on at least one of the thermal loads detected by the temperature sensors.

In some embodiments of the electrical device, the controller is configured to adjust the one or more operating parameters for the one or more device components by redirecting at least one signal from a signal path to another signal path based on at least one of the thermal loads detected by the temperature sensors.

In some embodiments of the electrical device, the plurality of temperature sensors may include thermocouples and/or thermistors.

In some embodiments of the electrical device, one or more of the temperature sensors are printed on the die.

In some embodiments of the electrical device, the electrical device includes a field programmable gate array (FPGA), a system on a chip (SoC), an application-specific integrated circuit (ASIC), a memory device, a central processing unit (CPU), and/or a microcontroller.

A system for thermally controlled performance of at least one electrical device is also disclosed. In one or more embodiments, the system includes a plurality of temperature sensors disposed upon or at least partially embedded within at least one die. The plurality of temperature sensors are configured to detect thermal loads at respective portions of the die. In embodiments, the system further includes at least one controller communicatively coupled to the temperature sensors. The controller is configured to adjust one or more operating parameters for one or more device components disposed upon or at least partially embedded within the die based on the thermal loads detected by the sensors.

In some embodiments of the system, the controller is configured to adjust the one or more operating parameters for the one or more device components by throttling a clock speed of at least one device component based on at least one of the thermal loads detected by the temperature sensors.

In some embodiments of the system, the controller is configured to adjust the one or more operating parameters for the one or more device components by limiting a bandwidth of at least one device component based on at least one of the thermal loads detected by the temperature sensors.

In some embodiments of the system, the controller is configured to adjust the one or more operating parameters for the one or more device components by at least partially disabling at least one device component based on at least one of the thermal loads detected by the temperature sensors.

In some embodiments of the system, the controller is configured to adjust the one or more operating parameters for the one or more device components by reprogramming at least one device component based on at least one of the thermal loads detected by the temperature sensors.

In some embodiments of the system, the controller is configured to adjust the one or more operating parameters for the one or more device components by transferring at least one function from a device component to another device component based on at least one of the thermal loads detected by the temperature sensors.

In some embodiments of the system, the controller is configured to adjust the one or more operating parameters for the one or more device components by redirecting at least one signal from a signal path to another signal path based on at least one of the thermal loads detected by the temperature sensors.

In some embodiments of the system, the plurality of temperature sensors may include thermocouples and/or thermistors.

In some embodiments of the system, one or more of the temperature sensors are printed on the die.

A method for thermally controlled performance of at least one electrical device is also disclosed. In one or more embodiments of the method, thermal loads are detected at respective portions of at least one die with a plurality of temperature sensors disposed upon or at least partially embedded within the die. One or more operating parameters for one or more device components disposed upon or at least partially embedded within the die are then adjusted based on the thermal loads detected by the plurality of temperature sensors.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1F is a block diagram illustrating an electrical device with thermally controlled performance, in accordance with one or more embodiments of this disclosure;

DETAILED DESCRIPTION

Figure 1A:
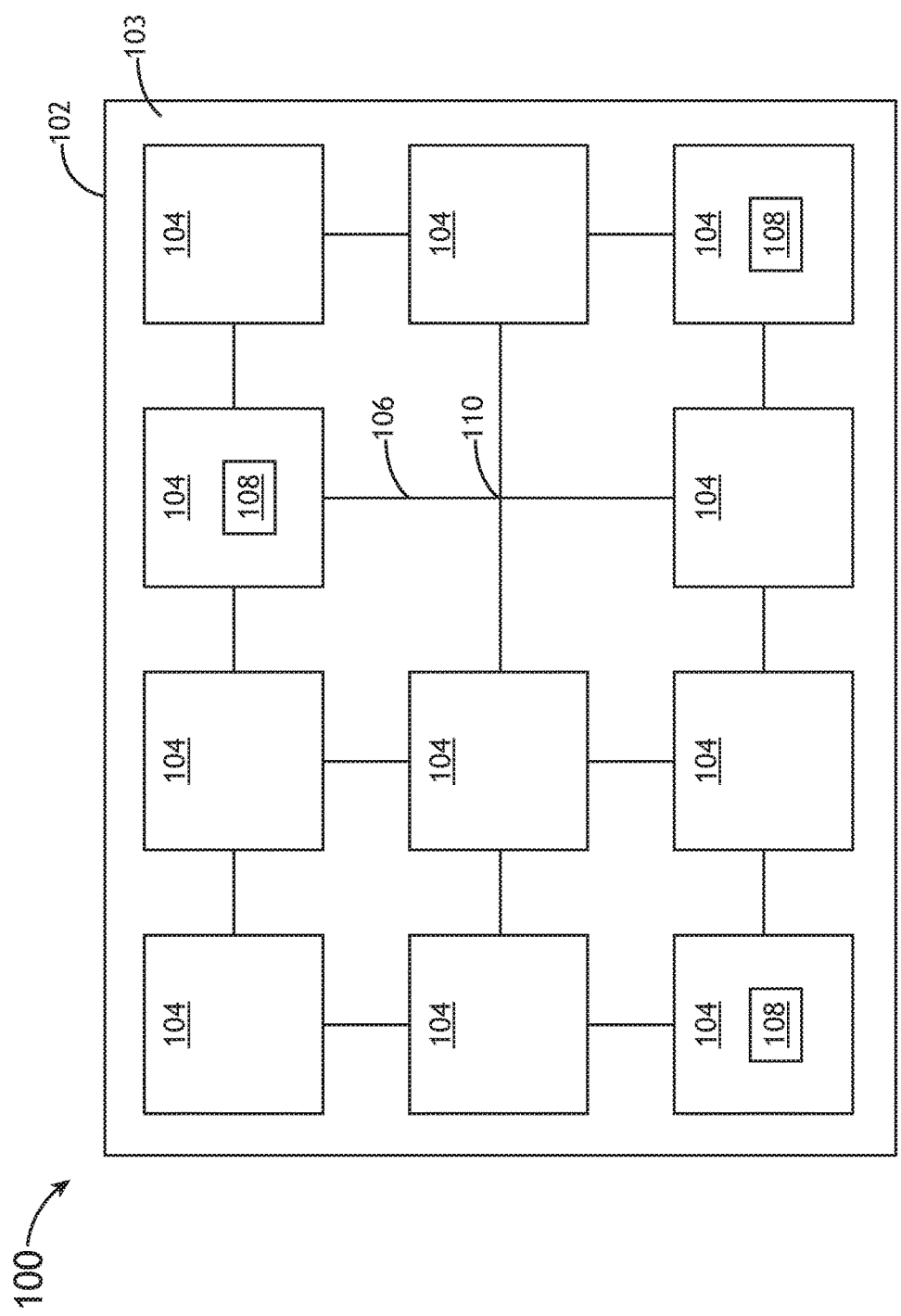
FIG. 1A is a block diagram illustrating an electrical device with thermally controlled performance, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

An electrical device/system with thermally controlled performance is disclosed. In embodiments, die-level temperature sensors are located at key thermal load points within the electrical device/system. A real-time (or near real-time) interactive control system may then monitor thermal load point temperatures and control performance at respective thermal load points to maintain appropriate temperatures and thermal load distribution in order to prevent overheating of components and die regions that can result in degraded performance of device components, signal paths, and/or the overall device/system. Furthermore, when monitoring multiple thermal load points, system performance may be shifted from high thermal load areas of the device/system to lower thermal load areas of the device/system. This shifting of performance across the device/system based on thermal load may help yield optimal/improved performance by spreading the thermal load across the device/system. Additionally, devices and/or their components may be monitored over a specific temperature range to find and optimize their performance based on thermal load.

Temperature sensors (e.g., thermocouples, thermistors, or the like) may be distributed across an electrical device for general thermal performance issues or specifically located within the electrical device (e.g., field programmable gate array (FPGA), system on a chip (SoC), application-specific integrated circuit (ASIC), memory device, central processing unit (CPU), microcontroller, or the like) to pinpoint thermal status at one or more selected points within the device. On select thermal devices, multiple temperature sensors may be utilized to monitor signaling device components to allow for performance adjustments based on exact thermal load points within the electrical device.

In some embodiments, the electrical device (e.g., FPGA, ASIC, etc.) may utilize the temperature sensors to dynamically alter performance within the device to shift thermal load away from areas of concern. For example, the electrical device may reduce performance (e.g., throttle clock speed or limit bandwidth) of a device component, redirect computations and/or signal traffic to less utilized device components and/or portions of the electrical device, shut down or otherwise disable functions, or by other compromises.

It may be advantageous to place the temperature sensors as close to the monitored thermal load points as possible. Various sensor technologies may be utilized, however, incorporating a temperature sensor within the electrical device structure may yield the most accurate and meaningful solution. In some embodiments, printed temperature sensors can be located at thermal load areas within a device/die surface to allow for sensor placement flexibility, accuracy, and control.

An electrical device/system with thermally controlled performance, as described herein, may be able to maintain a safe thermal system (footprint) by monitoring select thermal load points and controlling these points within safe thermal load operating parameters by adjusting select performance parameters at device components and/or identified regions of the electrical device, or by shifting thermal loads from hotter to cooler portions of the electrical device. The disclosed electrical device/system with thermally controlled performance may also allow for improved electrical performance and/or efficiency within a controlled thermal system.

FIGS. 1A through 1F are block diagrams illustrating various embodiments of an electrical device 100 with thermally controlled performance. The electrical device 100 may be any electrical device that includes at least one die 102 (e.g., silicon wafer, or the like) with active circuitry (e.g., device components 104, signal paths 106, transistors, resistors, capacitors, inductors, diodes, etc.) disposed upon and/or at least partially embedded in the die 102. For example, in embodiments, the electrical device 100 may include, but is not limited to, a FPGA, SoC, ASIC, memory device, CPU, microcontroller, or the like.

In embodiments, the electrical device 100 includes a plurality of device components 104 disposed upon or at least partially embedded within the die 102. For example, the device components 104 may include, but are not limited to, controllers, processors, memory, multiplexers, sensors, configurable logic blocks (CLBs), transmitters, receivers, transceivers, or any combination thereof. The device components 104 may be mounted to the die 102, fabricated from one or more layers (e.g., metal layers, dielectric layers, etc.) of the die 102, and/or printed onto the die 102.

The electrical device 100 further includes a plurality of signal paths 106 interconnecting the device components 104. In some embodiments, the electrical device 100 may also include one or more nodes 110 where two or more of the signal paths 106 intersect or otherwise connect. The signal paths 106 may be formed from wires, traces, or other conductive elements that are mounted to the die 102, fabricated from one or more layers (e.g., metal layers, etc.) of the die 102, and/or printed onto the die 102.

In embodiments, a plurality of temperature sensors 108 are disposed upon or at least partially embedded within the die 102. For example, the temperature sensors 108 may include thermocouples, thermistors, or any other electronic temperature sensors that are mounted to the die 102, fabricated from one or more layers (e.g., metal layers, dielectric layers, etc.) of the die 102, and/or printed onto the die 102. In some embodiments, the temperature sensors 108 are thermocouples printed onto the die with an additive manufacturing technique (e.g., AEROSOL JET technology, by Optomec, Inc., or the like).

The temperature sensors 108 are configured to detect thermal loads at respective portions of the die 102. For example, the temperature at respective portion of the die 102 may be detected based on one or more electrical parameters associated with the temperature sensor 108. In some embodiments, the temperature sensors 108 include thermocouples that formed from at least two different conductive materials, where the voltage between the two conductive materials of a thermocouple is indicative of the temperature at the respective portion of the die 102. Alternatively, or additionally, the temperature sensors 108 may include thermistors, where the resistance value of a thermistor is indicative of the temperature at the respective portion of the die 102.

The temperature sensors 108 may be disposed upon or at least partially embedded within the die 102 using any fabrication process known in the art. For example, the temperature sensors 108 may be mounted or printed onto the die 102, either on the front side 103 (e.g., active circuitry side) or the backside 105 (e.g., non-active circuitry side). As shown in FIGS. 1A through 1F, the temperature sensors 108 may be located various portions of the die 102 and/or device components 104, signal paths 106, or other structures that are on the die 102. For example, the plurality of sensors 108 may be located at key thermal load points of the die 102/electrical device 100.

Figure 1B:
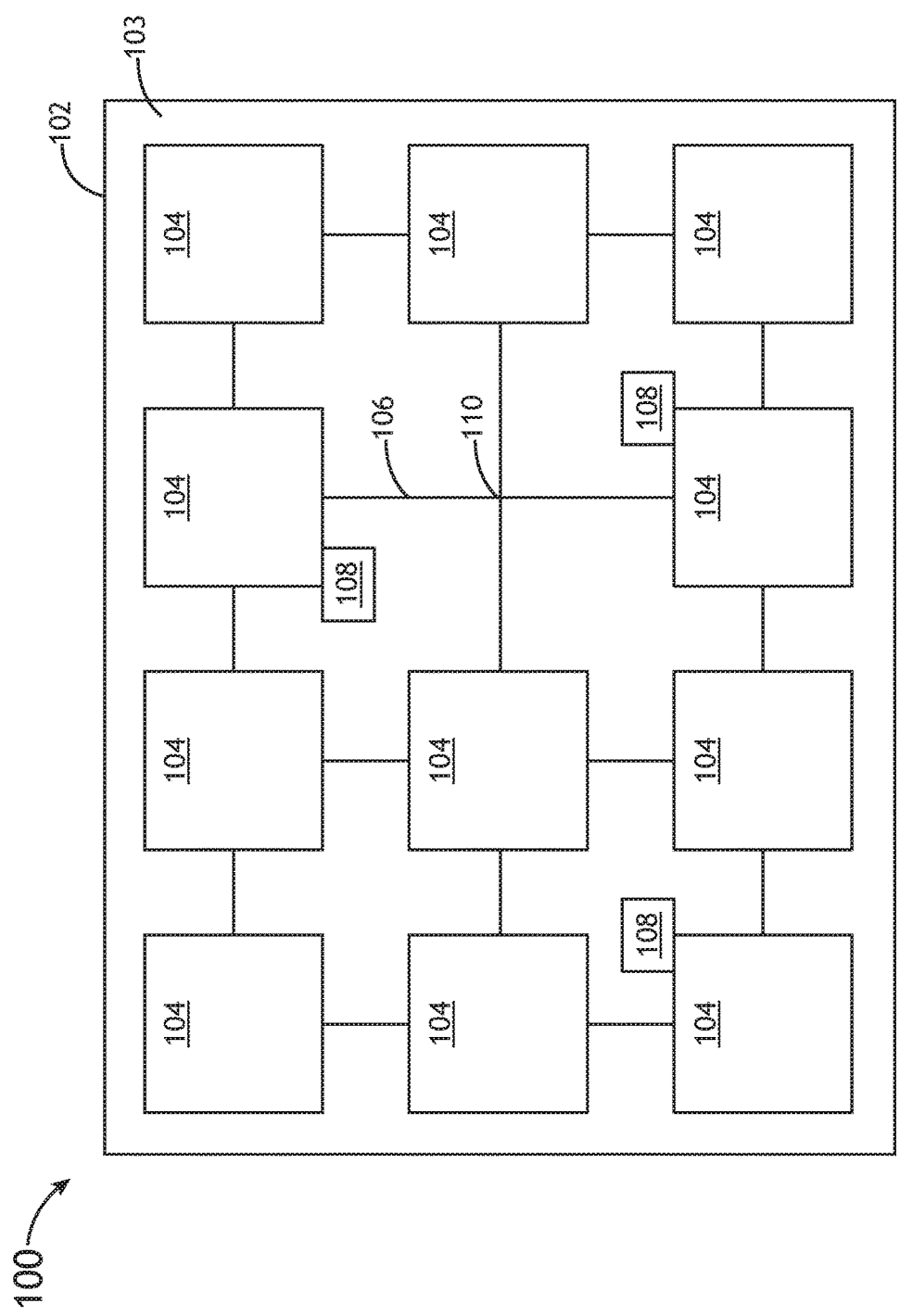
FIG. 1B is a block diagram illustrating an electrical device with thermally controlled performance, in accordance with one or more embodiments of this disclosure.
Figure 1C:
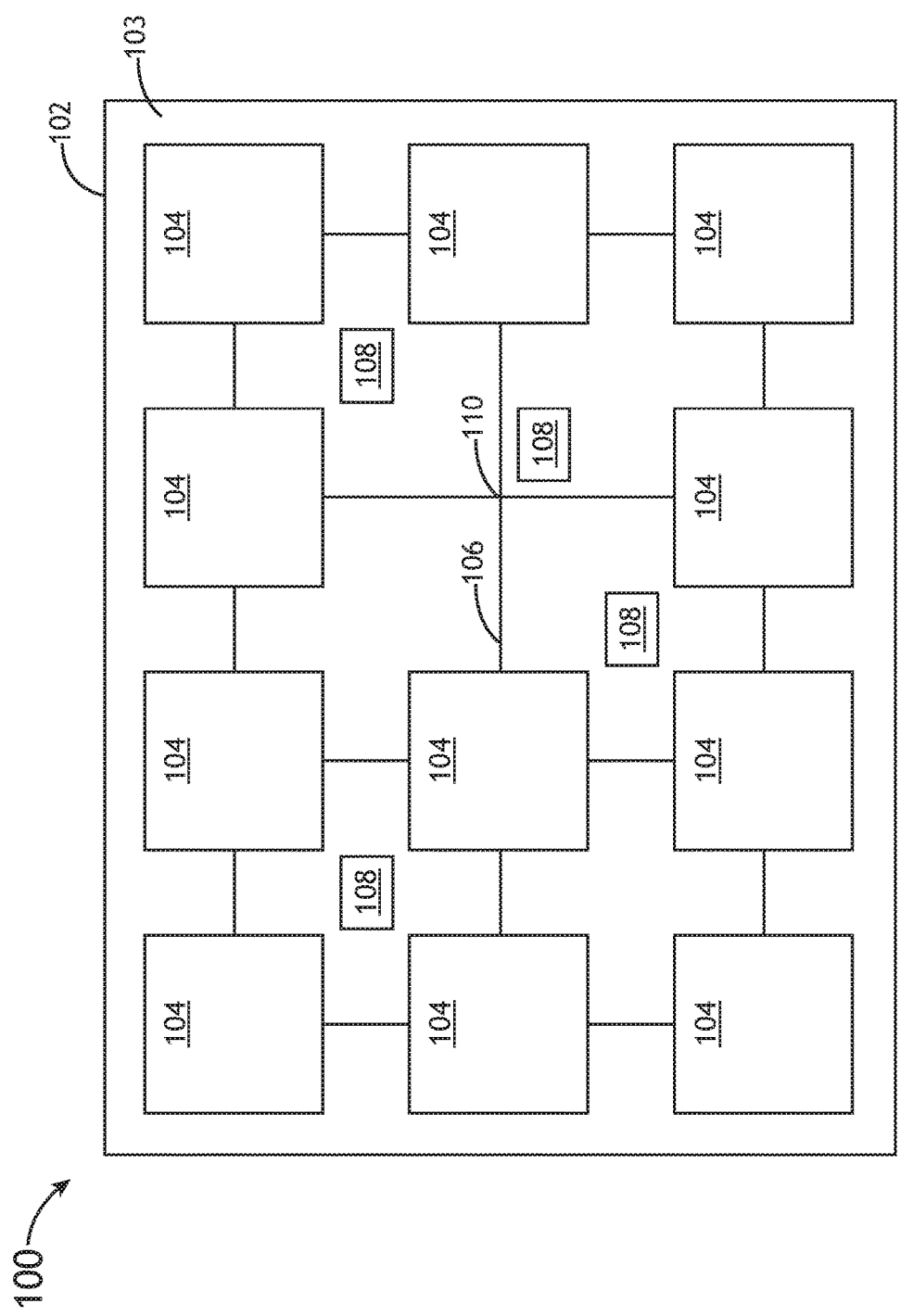
FIG. 1C is a block diagram illustrating an electrical device with thermally controlled performance, in accordance with one or more embodiments of this disclosure.
Figure 1D:
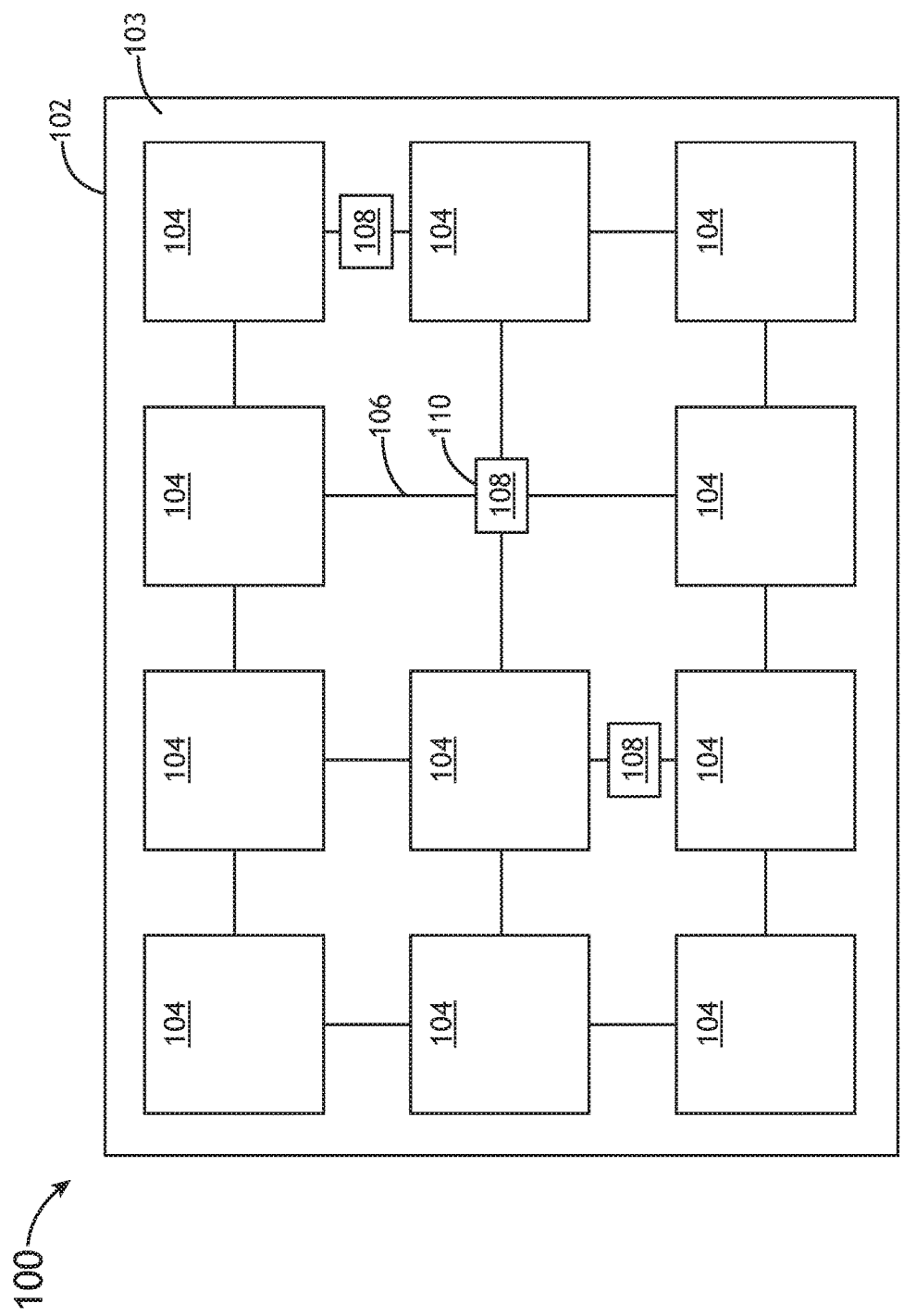
FIG. 1D is a block diagram illustrating an electrical device with thermally controlled performance, in accordance with one or more embodiments of this disclosure.
Figure 1E:
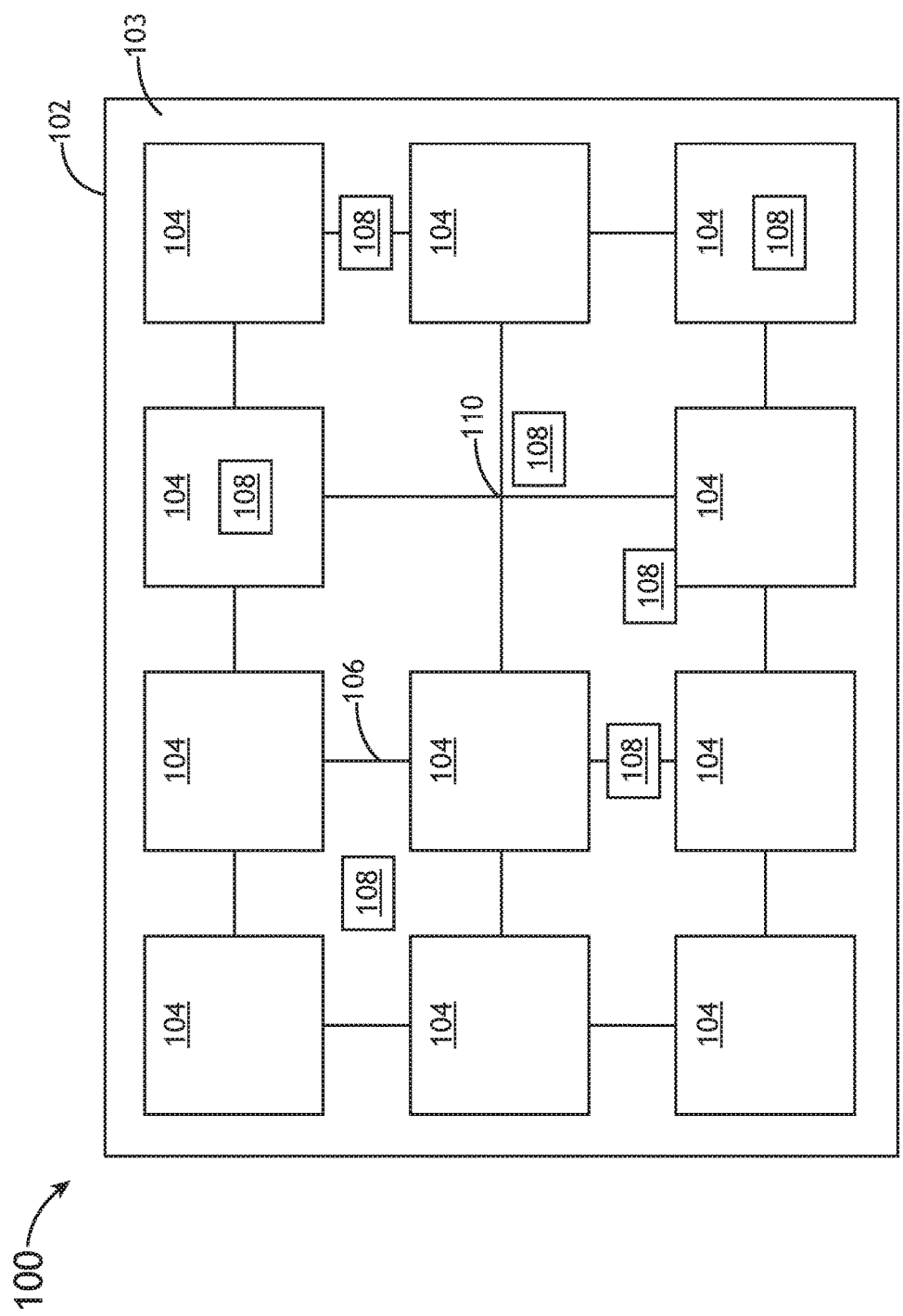
FIG. 1E is a block diagram illustrating an electrical device with thermally controlled performance, in accordance with one or more embodiments of this disclosure.

Referring to FIG. 1A, the temperature sensors 108 may be disposed upon or at least partially embedded within one or more of the device components 104. Alternatively, or additionally, as shown in FIG. 1B, temperature sensors 108 may be coupled to or disposed alongside one or more of the device components 104. In some embodiments, temperature sensors 108 may be coupled to device components 104 using thermal/electrical conductors, adhesives, printed/etched traces, wiring, cables, leads, or the like. In other embodiments (e.g., as shown in FIG. 1C), temperature sensors 108 may be disposed near the device components 104. For example, temperature sensors 108 may be mounted, printed, or otherwise formed on the die 102 at select portions/regions of interest (e.g., near one or more device components 104, near signal paths 106/nodes 110, or the like). Alternatively, or additionally, as shown in FIG. 1D, temperature sensors 108 may be disposed upon, coupled to, or disposed alongside one or more of the signal paths 106 and/or nodes 110. FIG. 1E illustrates an example of how the temperature sensors 108 may be placed in a combination of locations (e.g., on/in device components 104, at signal paths 106/nodes 110, and/or at other portions/regions of interest on the die 102). In some embodiments, such as the embodiment illustrated in FIG. 1F, temperature sensors 108 are disposed upon or at least partially embedded in the backside 105 (opposite the active circuitry (front) side 103) of the die 102. For example, temperature sensors 108 may be mounted, printed, or otherwise formed on the backside 105 of the die 102 at select portions/regions of interest (e.g., near one or more device components 104 and/or signal paths 106/nodes 110 on the active circuitry (front) side 103 of the die 102).

Figure 2:
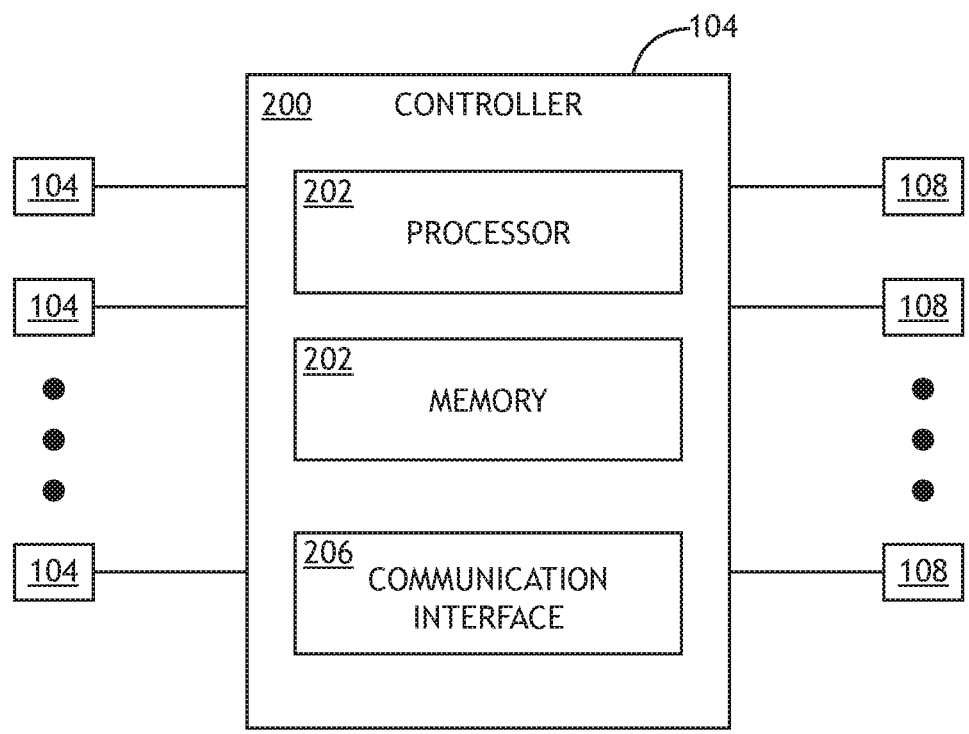
FIG. 2 is a block diagram illustrating at least one controller for an electrical device with thermally controlled performance, in accordance with one or more embodiments of this disclosure.

Referring now to FIG. 2, the electrical device 100 includes at least one controller 200 communicatively coupled to device components 104 and temperature sensors 108. In some embodiments, the controller 200 is formed by one or more device components 104 on the die 102. For example, the controller 200 may be a device component 104 or can be made up of a plurality of device components 104. Furthermore, in some embodiments, the electrical device 100 may include a plurality of controllers 200, each being formed by one or more device components 104 on the die 102. The controller 200 may include, but is not limited to, at least one processor 202, memory 204, and communication interface 206.

The processor 202 provides processing functionality for at least the controller 200 and can include any number of processors, micro-controllers, circuitry, field programmable gate array (FPGA) or other processing systems, and resident or external memory for storing data, executable code, and other information accessed or generated by the controller 200. The processor 202 can execute one or more software programs embodied in a non-transitory computer readable medium (e.g., memory 204) that implement techniques described herein. The processor 202 is not limited by the materials from which it is formed, or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the controller 200/processor 202, such as software programs and/or code segments, or other data to instruct the processor 202, and possibly other components of the controller 200, to perform the functionality described herein. Thus, the memory 204 can store data, such as a program of instructions for operating the controller 200, including its components (e.g., processor 202, communication interface 206, etc.), and so forth. It should be noted that while a single memory 204 is described, a wide variety of types and combinations of memory (e.g., tangible, non-transitory memory) can be employed. The memory 204 can be integral with the processor 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the controller 200. For example, the communication interface 206 can be configured to retrieve data from the processor 202 or other devices, transmit data for storage in the memory 204, retrieve data from storage in the memory 204, and so forth. The communication interface 206 can also be communicatively coupled with the processor 202 to facilitate data transfer between components of the controller 200 and the processor 202. It should be noted that while the communication interface 206 is described as a component of the controller 200, one or more components of the communication interface 206 can be implemented as external components communicatively coupled to the controller 200 via a wired and/or wireless connection. The controller 200 may be connected to one or more input/output (I/O) devices, system components (e.g., device components 104, signal paths 106/nodes 110, temperature sensors 108, etc.), and so forth via the communication interface 206. In embodiments, the communication interface 206 may include a transmitter, receiver, transceiver, physical connection interface, or any combination thereof.

The controller 200 may be configured to detect thermal loads via the temperature sensors 108. For example, the controller 200 may be configured to detect thermal loads (e.g., temperatures or other thermal measurements) at respective portions of the die 102 based on one or more parameters (e.g., amplitude, voltage, etc.) of the signals that are output by the temperature sensors 108. In embodiments, the controller 200 is further configured to adjust one or more operating parameters for one or more of the device components 104 based on the thermal loads detected by the temperature sensors 108.

In some embodiments, the electrical device 100 may use the temperature sensors 108 to dynamically alter performance within the electrical device 100 to shift thermal load away from areas of concern. For example, the controller 200 may be configured to throttle a clock speed or limit a bandwidth of at least one device component 104 based on at least one of the thermal loads detected by the temperature sensors 108 (e.g., based on a temperature of the device component 104, respective portion/region of the die 102, and/or a correlated device component 104, signal path 106, or node 110). The controller 200 may also (or alternatively) be configured to at least partially disable at least one device component 104 (i.e., prevent some or all of its functionality) based on at least one of the thermal loads detected by the temperature sensors 108.

In some embodiments, the controller 200 may be configured to reprogram at least one device component 104 based on at least one of the thermal loads detected by the temperature sensors 108. For example, the controller 200 may be configured to alter a process performed by the device component 104 by reducing or redistributing steps/operations executed by the device component 104. In some embodiments, the controller 200 may be configured to transfer at least one function from a device component 104 to another device component 104 based on at least one of the thermal loads detected by the temperature sensors 108. For instance, the controller 200 may transfer a function from a device component 104 with a high thermal load to another device component 104 with a low thermal load. The transferring (e.g., shifting) of functions from one device component 104 to another may allow the electrical device 100 to improve overall performance by spreading the thermal load across the electrical device 100. In the case of an FPGA, for instance, the controller 200 may be configured to reprogram CLBs making up the FPGA so that a function performed by a first group of CLBs (at a hotter region of the die 102) is moved to a second group of CLBs (at a cooler region of the die 102). In this regard, dynamic re-allocation can be accomplished with partial reconfiguration within the FPGA, rather than reprogramming the entire part, or swapping data flow between existing logic. Instead high heat generating logic may be swapped in and out while the remainder of the FPGA remains in use.

In some embodiments, the controller 200 may be configured to redistribute thermal loads on the die 102 by redirecting signal traffic from hotter portions/regions of the die 102 to cooler portions/regions of the die 102. For example, the controller 200 may be configured to redirect at least one signal from a signal path 106 to another signal path 106 based on at least one of the thermal loads detected by the temperature sensors 108 (e.g., based on a temperature of the signal path 106, respective portion/region of the die 102, and/or a correlated device component 104, signal path 106, or node 110).

Figure 3A:
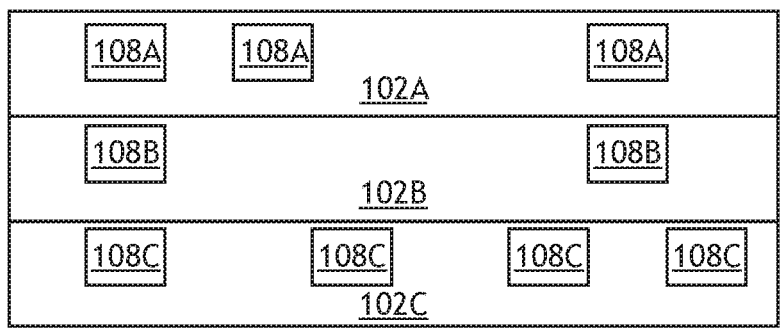
FIG. 3A is a block diagram illustrating an electrical device with thermally controlled performance, wherein the electrical device includes a plurality of die, in accordance with one or more embodiments of this disclosure.
Figure 3B:
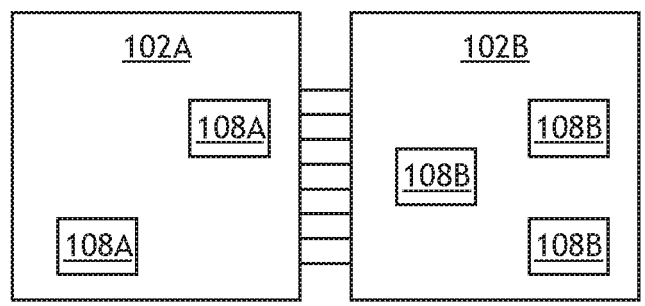
FIG. 3B is a block diagram illustrating an electrical device with thermally controlled performance, wherein the electrical device includes a plurality of die, in accordance with one or more embodiments of this disclosure.
Figure 3C:
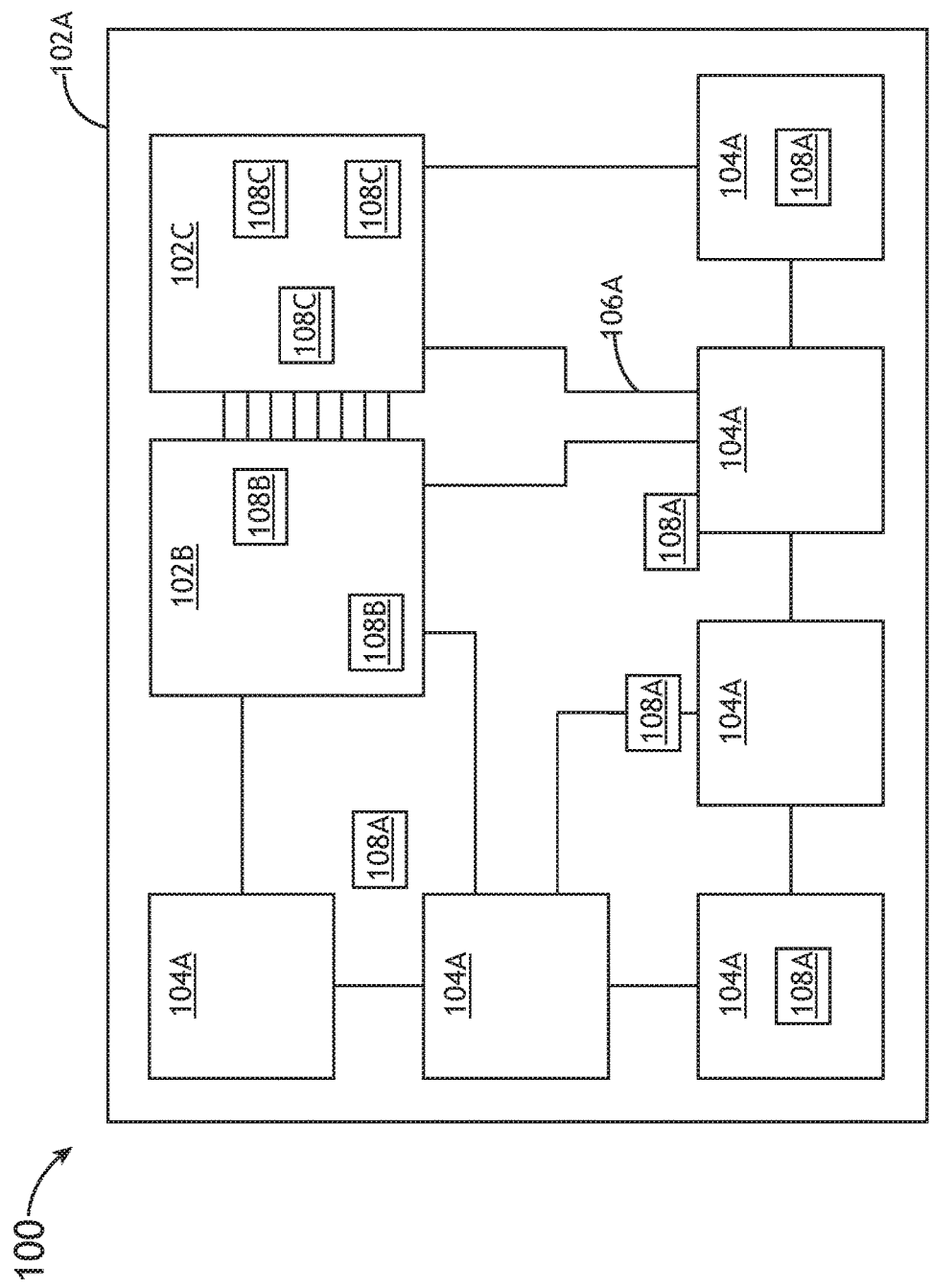
FIG. 3C is a block diagram illustrating an electrical device with thermally controlled performance, wherein the electrical device includes a plurality of die, in accordance with one or more embodiments of this disclosure.

As shown in FIGS. 3A through 3C, the electrical device 100 may include a plurality of die 102 (e.g., die 102A, 102B, and 102C, etc.) coupled together in various configurations. For example, in an embodiment illustrated in FIG. 3A, the electrical device 100 includes a plurality of vertically stacked die 102A, 102B, 102C (i.e., die stacked on top of one another). Alternatively, the die 102A, 102B, and 102C may be stacked horizontally or in a side-by-side configuration (e.g., die 102A and 102B in FIG. 3B). Still, in further embodiments, the electrical device 100 may include a larger (main) die 102A with one or more die 102B, 102C mounted on the main die 102A. In such embodiments, the die 102A may have a combination of the device components 104A and the die 102B, 102C mounted on and/or at least partially embedded in the die 102A, and the device components 104A may be communicatively coupled to the die 102B and/or 102C via signal paths 106A on the die 102A.

In any of the multi-die configurations, the die 102A, 102B, 102C may function in a similar manner as the (single) die 102 described in FIGS. 1A through 2. For example, one or more controllers 200 on the die 102A, 102B, and/or 102C may be configured to detect thermal loads (e.g., temperatures or other thermal measurements) at respective portions of the die 102A, 102B, and/or 102C based on one or more parameters (e.g., amplitude, voltage, etc.) of the signals that are output by temperature sensors 108A, 108B, and/or 108C distributed amongst the die 102A, 102B, and/or 102C. In embodiments, the one or more controllers 200 are further configured to adjust one or more operating parameters for one or more of the device components 104 based on the thermal loads detected by the temperature sensors 108A, 108B, and/or 108C.

The electrical device 100 can use the temperature sensors 108A, 108B, and/or 108C to dynamically alter performance within the electrical device 100 to shift thermal load away from areas of concern. For example, the one or more controllers 200 may be configured to throttle a clock speed or limit a bandwidth of at least one device component 104 on the die 102A, 102B, and/or 102C based on at least one of the thermal loads detected by the temperature sensors 108A, 108B, and/or 108C (e.g., based on a temperature of the device component 104, respective portion/region of the die 102A, 102B, and/or 102C, and/or a correlated device component 104, signal path 106, or node 110). The one or more controllers 200 may also (or alternatively) be configured to at least partially disable at least one device component 104 (i.e., prevent some or all of its functionality) based on at least one of the thermal loads detected by the temperature sensors 108A, 108B, and/or 108C.

In some embodiments, the one or more controller 200 may be configured to reprogram at least one device component 104 based on at least one of the thermal loads detected by the temperature sensors 108A, 108B, and/or 108C. For example, the one or more controllers 200 may be configured to alter a process performed by the device component 104 by reducing or redistributing steps/operations executed by the device component 104. In some embodiments, the one or more controllers 200 may be configured to transfer at least one function from a device component 104 (or die 102) to another device component 104 (or die 102) based on at least one of the thermal loads detected by the temperature sensors 108A, 108B, and/or 108C. For instance, the one or more controllers 200 may transfer a function from a device component 104 (or die 102) with a high thermal load to another device component 104 (or die 102) with a low thermal load. The transferring (e.g., shifting) of functions from one device component 104 (or die 102) to another device component 104 (or die 102) may allow the electrical device 100 to improve overall performance by spreading the thermal load across the electrical device 100. In the case of an FPGA, for instance, the one or more controllers 200 may be configured to reprogram CLBs making up the FPGA so that a function performed by a first group of CLBs (at a hotter region of the die 102A, 102B, and/or 102C) is moved to a second group of CLBs (at a cooler region of the die 102A, 102B, and/or 102C).

In some embodiments, the one or more controllers 200 may be configured to redistribute thermal loads on the die 102A, 102B, and/or 102C by redirecting signal traffic from hotter portions/regions of the die 102A, 102B, and/or 102C to cooler portions/regions of the die 102A, 102B, and/or 102C, or from one die 102 to another die 102. For example, the one or more controllers 200 may be configured to redirect at least one signal from a signal path 106 to another signal path 106 based on at least one of the thermal loads detected by the temperature sensors 108A, 108B, and/or 108C (e.g., based on a temperature of the signal path 106, respective portion/region of the die 102A, 102B, and/or 102C, and/or a correlated device component 104, signal path 106, or node 110).

In some embodiments, one die (e.g., 102A) may be a master die with one or more controllers 200 connected to the temperature sensors 108A, 108B, and 108C on the die 102A, 102B, and 108C. In other embodiments, two or more die 102A, 102B, 102C may include respective controllers 200, where the controllers 200 may be configured to communication with one another (e.g., to communicate thermal measurements, request transfer of processing or signal traffic, or the like).

Various embodiments of an electrical device 100 with thermally controlled performance have been described with reference to FIGS. 1A through 3C. However, in other embodiments, the electrical device 100 and/or system for thermally controlled performance may be modified without deviating from the scope of this disclosure. For example, any of the components (e.g., die 102, device components 104, signal paths 106, nodes 110, temperature sensors 108, controllers 200, etc.) described herein may be implemented by a plurality of components. In this regard, any reference to "a" or "the" component should be understood as a reference to "one or more" of the same component.

Figure 4:
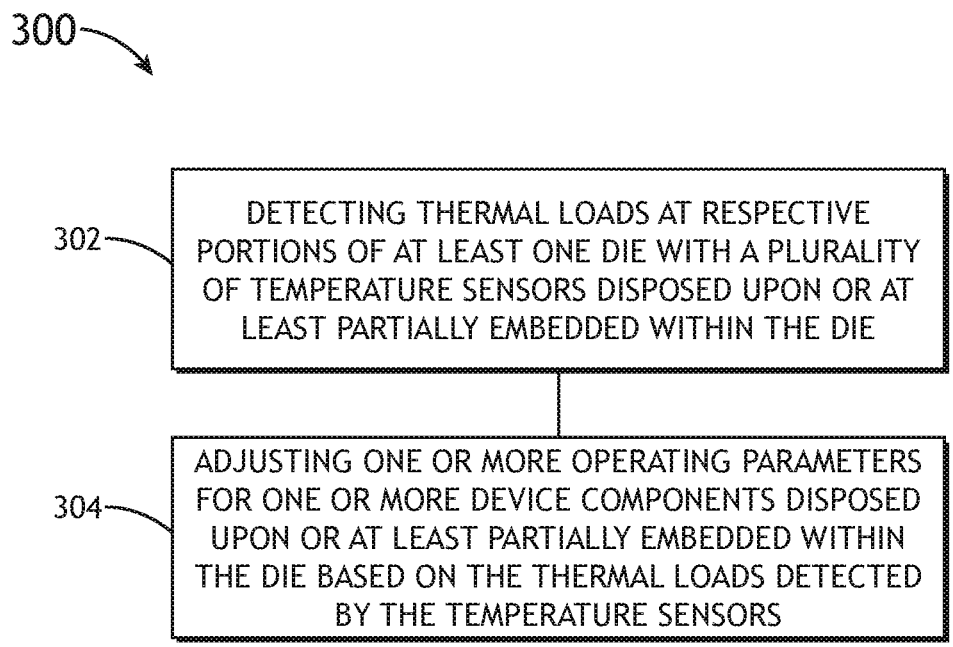
FIG. 4 is a flow diagram illustrating a method for thermally controlled performance of an electrical device, in accordance with one or more embodiments of this disclosure.

FIG. 4 illustrates a method 300 for thermally controlled performance of an electrical device, such as the electrical device 100 illustrated in any of FIGS. 1A through 3C, or any combination thereof. The method 300 may be carried out by the electrical device 100 with thermally controlled performance described herein. In this regard, the electrical device 100 may include any component/configuration required to carry out a step/function of the method 300; similarly, the method 300 may include any step/function that corresponds to a component/configuration of the electrical device 100. For example, one or more controllers 200 of the electrical device 100 may be configured to carry out various steps and functions of the method 300 illustrated in FIG. 4.

As shown in FIG. 4, the method 300 includes detecting thermal loads at respective portions of at least one die 102 with temperature sensors 108 disposed upon or at least partially embedded within the die 102 (block 302). For example, the controller 200 may be configured to detect thermal loads at respective portions of the die 102 via the temperature sensors 108 (e.g., as described above). The method 300 further includes adjusting one or more operating parameters for one or more device components 104 disposed upon or at least partially embedded within the die 102 based on the thermal loads detected by the temperature sensors 108 (block 304). For example, the controller 200 may be further configured to adjust one or more operating parameters for one or more of the device components 104 on the die 102 based on the thermal loads detected by the temperature sensors 108 (e.g., as described above).

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An electrical device with thermally controlled performance, comprising:
   at least one die;
   a plurality of device components disposed upon or at least partially embedded within the at least one die;
   a plurality of signal paths interconnecting the plurality of device components;
   a plurality of temperature sensors disposed upon or at least partially embedded within the at least one die, the plurality of temperature sensors configured to detect thermal loads at respective portions of the at least one die;
   at least one controller disposed upon or at least partially embedded within the at least one die, the at least one controller configured to adjust one or more operating parameters for one or more device components of the plurality of device components based on the thermal loads detected by the plurality of temperature sensors, wherein the at least one controller is configured to adjust the one or more operating parameters for the one or more device components by transferring at least one function from a device component to another device component based on at least one of the thermal loads detected by the plurality of temperature sensors.

2. The electrical device of claim 1, wherein the at least one controller is configured to adjust the one or more operating parameters for the one or more device components by throttling a clock speed of at least one device component based on at least one of the thermal loads detected by the plurality of temperature sensors.

3. The electrical device of claim 1, wherein the at least one controller is configured to adjust the one or more operating parameters for the one or more device components by limiting a bandwidth of at least one device component based on at least one of the thermal loads detected by the plurality of temperature sensors.

4. The electrical device of claim 1, wherein the at least one controller is configured to adjust the one or more operating parameters for the one or more device components by at least partially disabling at least one device component based on at least one of the thermal loads detected by the plurality of temperature sensors.

5. The electrical device of claim 1, wherein the at least one controller is configured to adjust the one or more operating parameters for the one or more device components by reprogramming at least one device component based on at least one of the thermal loads detected by the plurality of temperature sensors.

6. The electrical device of claim 1, wherein the at least one controller is configured to adjust the one or more operating parameters for the one or more device components by redirecting at least one signal from a signal path to another signal path based on at least one of the thermal loads detected by the plurality of temperature sensors.

7. The electrical device of claim 1, wherein the plurality of temperature sensors comprise at least one of thermocouples or thermistors.

8. The electrical device of claim 1, wherein one or more of the plurality of temperature sensors are printed on the at least one die.

9. The electrical device of claim 1, wherein the electrical device comprises at least one of a field programmable gate array (FPGA), a system on a chip (SoC), an application-specific integrated circuit (ASIC), a memory device, a central processing unit (CPU), or a microcontroller.

10. A system for thermally controlled performance, comprising:
    a plurality of temperature sensors disposed upon or at least partially embedded within at least one die, the plurality of temperature sensors configured to detect thermal loads at respective portions of the at least one die;
    at least one controller communicatively coupled to the plurality of temperature sensors, the at least one controller configured to adjust one or more operating parameters for one or more device components disposed upon or at least partially embedded within the at least one die based on the thermal loads detected by the plurality of temperature sensors, wherein the at least one controller is configured to adjust the one or more operating parameters for the one or more device components by redirecting at least one signal from a signal path to another signal path based on at least one of the thermal loads detected by the plurality of temperature sensors.

11. The system of claim 10, wherein the at least one controller is configured to adjust the one or more operating parameters for the one or more device components by throttling a clock speed of at least one device component based on at least one of the thermal loads detected by the plurality of temperature sensors.

12. The system of claim 10, wherein the at least one controller is configured to adjust the one or more operating parameters for the one or more device components by limiting a bandwidth of at least one device component based on at least one of the thermal loads detected by the plurality of temperature sensors.

13. The system of claim 10, wherein the at least one controller is configured to adjust the one or more operating parameters for the one or more device components by at least partially disabling at least one device component based on at least one of the thermal loads detected by the plurality of temperature sensors.

14. The system of claim 10, wherein the at least one controller is configured to adjust the one or more operating parameters for the one or more device components by reprogramming at least one device component based on at least one of the thermal loads detected by the plurality of temperature sensors.

15. The system of claim 10, wherein the at least one controller is configured to adjust the one or more operating parameters for the one or more device components by transferring at least one function from a device component to another device component based on at least one of the thermal loads detected by the plurality of temperature sensors.

16. The system of claim 10, wherein the plurality of temperature sensors comprise at least one of thermocouples or thermistors.

17. The system of claim 10, wherein one or more of the plurality of temperature sensors are printed on the at least one die.

18. An electrical device with thermally controlled performance, comprising:

at least one die;

a plurality of device components disposed upon or at least partially embedded within the at least one die;

a plurality of signal paths interconnecting the plurality of device components;

a plurality of temperature sensors disposed upon or at least partially embedded within the at least one die, the plurality of temperature sensors configured to detect thermal loads at respective portions of the at least one die;

at least one controller disposed upon or at least partially embedded within the at least one die, the at least one controller configured to adjust one or more operating parameters for one or more device components of the plurality of device components based on the thermal loads detected by the plurality of temperature sensors, wherein the at least one controller is configured to adjust the one or more operating parameters for the one or more device components by redirecting at least one signal from a signal path to another signal path based on at least one of the thermal loads detected by the plurality of temperature sensors.

19. A system for thermally controlled performance, comprising:

a plurality of temperature sensors disposed upon or at least partially embedded within at least one die, the plurality of temperature sensors configured to detect thermal loads at respective portions of the at least one die;

at least one controller communicatively coupled to the plurality of temperature sensors, the at least one controller configured to adjust one or more operating parameters for one or more device components disposed upon or at least partially embedded within the at least one die based on the thermal loads detected by the plurality of temperature sensors, wherein the at least one controller is configured to adjust the one or more operating parameters for the one or more device components by transferring at least one function from a device component to another device component based on at least one of the thermal loads detected by the plurality of temperature sensors.

* * * * *